(12) United States Patent
Serizawa et al.

(10) Patent No.: US 7,191,278 B2
(45) Date of Patent: Mar. 13, 2007

(54) METHOD FOR DATA ACCESSING IN A COMPUTER SYSTEM INCLUDING A STORAGE SYSTEM

(75) Inventors: Kazuyoshi Serizawa, Machida (JP); Yasutomo Yamamoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 265 days.

(21) Appl. No.: 10/855,589

(22) Filed: May 28, 2004

(65) Prior Publication Data

US 2005/0235074 A1  Oct. 20, 2005

(30) Foreign Application Priority Data

Apr. 15, 2004 (JP) ............................. 2004-120201

(51) Int. Cl.
*G06F 13/14* (2006.01)
*G06F 12/00* (2006.01)

(52) U.S. Cl. .................. 711/100; 711/154; 711/161; 710/38; 710/74

(58) Field of Classification Search ................ 711/100, 711/154, 161, 162, 203; 710/38, 74, 107
See application file for complete search history.

(56) References Cited

U.S. PATENT DOCUMENTS

| | | | |
|---|---|---|---|
| 5,555,371 A * | 9/1996 | Duyanovich et al. ......... | 714/13 |
| 6,513,097 B1 * | 1/2003 | Beardsley et al. ......... | 711/113 |
| 6,631,477 B1 | 10/2003 | LeCrone et al. | |
| 6,836,830 B1 | 12/2004 | Yamagami et al. | |
| 2003/0070041 A1 * | 4/2003 | Beardsley et al. ......... | 711/113 |
| 2003/0204597 A1 | 10/2003 | Arakawa et al. | |
| 2004/0133752 A1 | 7/2004 | Suzuki et al. | |
| 2005/0071590 A1 | 3/2005 | Watanabe et al. | |

FOREIGN PATENT DOCUMENTS

JP  2003-316522  7/2003

* cited by examiner

*Primary Examiner*—Tuan V. Thai
(74) *Attorney, Agent, or Firm*—Mattingly, Stranger, Malur & Brundidge, P.C.

(57) ABSTRACT

The object of the invention is to improve data access performance in a computer system. At least one logical volume is provided in a storage device 13 connected to a host computer via a network 17, and two different paths, a first path and a second path, which are unique to that logical volume, are assigned to the logical volume. The storage device 12 comprises: means for performing data access with respect to the logical volume identified by the first path, if a data access request from the host computer 12 has been received via the first path; and means for carrying out, if a data access request has been received from the host computer 12 via the second path, a prescribed processing before the received data access, and then performing data access with respect to the logical volume identified by the second path.

8 Claims, 4 Drawing Sheets

METHOD FOR DATA ACCESSING IN A COMPUTER SYSTEM INCLUDING A STORAGE SYSTEM

CROSS-REFERENCES TO RELATED APPLICATIONS

This application relates to and claims priority from Japanese Patent Application No. 2004-120201, filed on Apr. 15, 2004, the entire disclosure of which is incorporated herein by reference.

BACKGROUND OF THE INVENTION

The present invention relates to technology for data access processing carried out between a host computer and a storage device, in a computer system comprising a host computer and a storage device.

Computer systems for managing large volumes of electronic data include computer systems having a host computer and a storage device, as typified by a disk array device. In a computer system, a secondary volume is defined with respect to the logical volume in the storage device (primary volume), as a provision against loss of data, or the like, and processing is implemented for managing the primary volume and the secondary volume as a pair.

Conventionally, in a computer system having a host computer and a storage device, a pair splitting technique is known whereby the defined pair of a primary volume and a secondary volume is split at a desired point in time (for example, Japanese Patent Laid-open No. 2003-316522). By splitting the pair in this way, it is possible to obtain a copy of the primary volume at the time of splitting, in the form of the secondary volume. Moreover, by using the split secondary volume, it is possible to perform back up (on-line back up) whilst an application program using the primary volume is still operating.

SUMMARY OF THE INVENTION

In a computer system, there are cases where it is necessary to achieve processing synchronism (align the processing timing) between data access processing carried out between a host computer and a storage device, and other processing carried out within the storage device. Typical examples of respective processes which require simultaneous operation of this kind are: pair split processing and data access processing. If pair split processing and data access processing are not carried out in a synchronized manner, then if, for example, data is written to the primary volume in the period from the instruction to split the pair until the completion of pair splitting, then it will be unclear whether or not the data written to the primary volume has been reflected in the secondary volume. In other words, even in cases where it is sought to acquire the data of the secondary volume as a snapshot, when there has been a request for pair splitting, there may be cases in which the data of the secondary volume has been updated from the data at the time that the pair split was requested. Consequently, it is not possible to use the secondary volume obtained as a snapshot by pair split processing, as back-up data.

In Japanese Patent Laid-open No. 2003-316522, the split processing and data access processing (data input/output processing) are synchronized by prohibiting writing operations from the host computer to the primary volume, in the period from the issue of a pair splitting instruction, until pair splitting is completed. Moreover, in another mode described in Japanese Patent Laid-open No. 2003-316522, if processing for writing data to the primary volume is implemented in the period from the issuing of a pair splitting instruction to the completion of pair splitting, then the contents thus written are stored, in their entirety, in a separate volume.

However, in a method for restricting data writing from the host computer to the primary volume, the user is caused to wait to perform data access processing, until the pair split processing has completed. The user carries out the data access processing after receiving a report indicating completion of the pair split processing, from the storage device, and hence productivity in administrative processing declines as a result. Furthermore, the method wherein all of the contents of the write operation are stored in a separate volume will cause a decline in the data input and output performance of the computer system.

Therefore, it is sought to increase the performance of data access processing in a computer system. More specifically, it is sought to achieve automatic synchronization of data access processing and processing which requires synchronization with data access processing, if such processing requiring synchronization arises.

One mode of the present invention is applied to a computer system comprising at least one host computer, and at least one storage system connected to the host computer via a network.

Here, the storage system comprises at least one logical volume, and two different paths, namely a first and a second path, which correspond uniquely to the logical volume. The method of data accessing according to the present invention comprises the steps of: issuing an access request relating to the logical volume, from the host computer to the storage system, by using either the first path or the second path; in the storage system, accessing data in the logical volume identified by the first path, if the storage system receives an access request via the first path; and in the storage system, executing a predetermined process beforehand, and then accessing data in the logical volume identified by the second path, if the storage system receives an access request via the second path. Here, the predetermined process means a process that requires synchronization with the data access processing.

According to the present invention having this composition, two paths, a first path and a second path are allocated to a logical volume. If a request for data access processing is received via a second path, then the storage system carries out the predetermined process before the received data access processing, and it then carries out data access processing with respect to the logical volume, as identified by the second path. In other words, in the present invention, by using a second path, it is possible to request data access processing, and a predetermined process (for example, pair split processing), in the storage system, at the same timing. Therefore, according to the present invention, it is possible to carry out data access processing and a predetermined processing (for example, pair split processing), without having to make the user wait to access data. Furthermore, there is no need to store all of the data contents written to the primary volume in the period from the issuing of the pair splitting instruction to the completion of pair splitting, in a separate volume, as is the case in Japanese Patent Laid-open No. 2003-316522. Therefore, according to the present invention, no decline is caused in the data input and output performance of the computer system.

DESCRIPTION OF THE PREFERRED EMBODIMENTS

Below, a computer system to which the embodiment of the present invention is applied will be described.

FIRST EMBODIMENT

To start with, a first embodiment of the present invention will be described.

Figure 1:
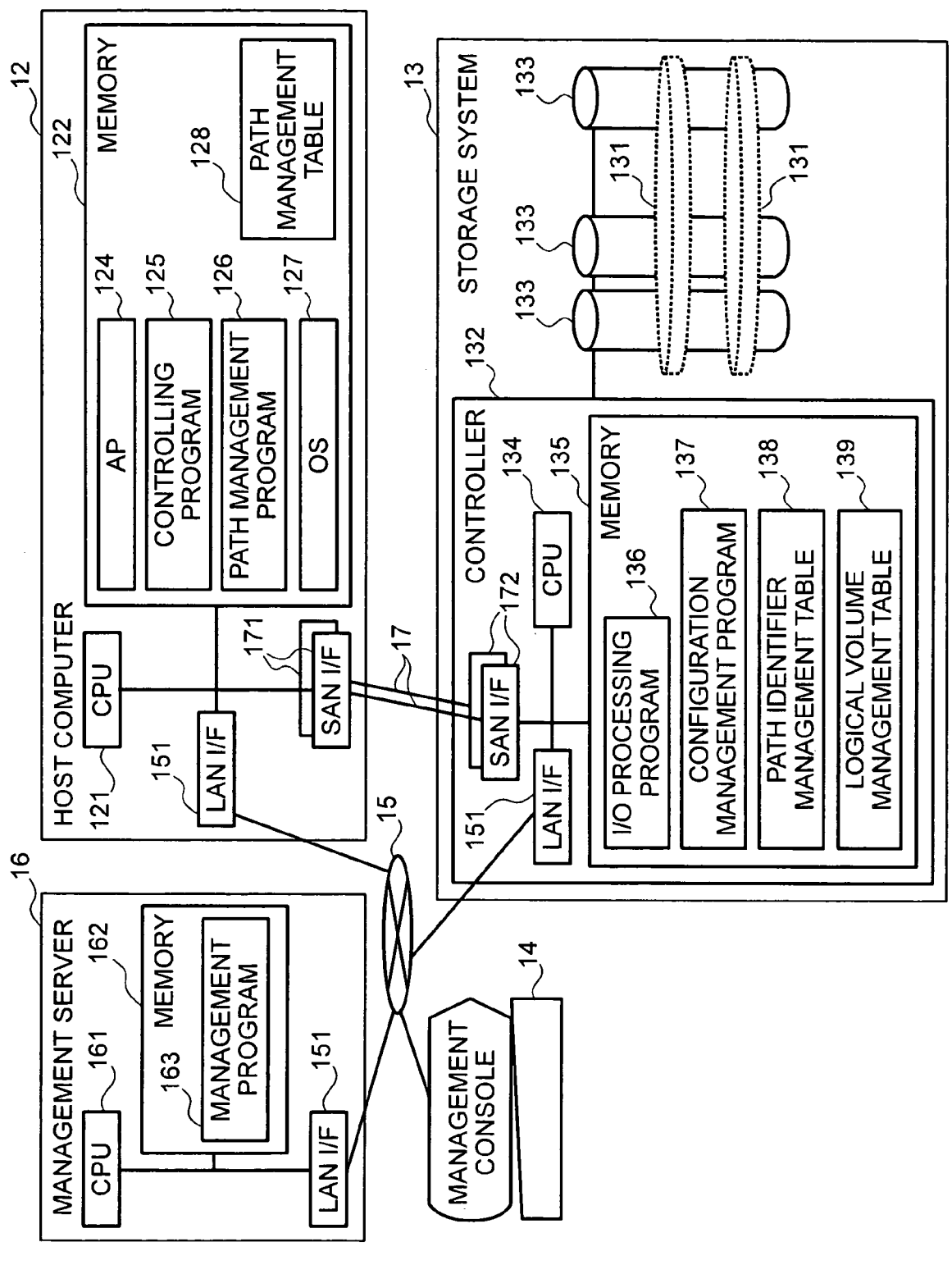
FIG. 1 is a diagram showing the overall composition of a computer system according to an embodiment of the present invention.

FIG. 1 shows the overall composition of a computer system according to a first embodiment of the present invention.

As shown in the diagram, the computer system according to the first embodiment comprises at least one host computer 12, at least one storage device 13, a LAN (Local Area Network) 15, a SAN (Storage Area Network) link 17, a management server 16, and a management console 14. The host computer 12, storage device 13, management console 14 and management server 16 are mutually connected by means of the LAN 15. Furthermore, the host computer 12 and the storage device 13 are mutually connected by means of the SAN link 17. The SAN link 17 does not have to be an independent link and it may also be a SAN which passes through a Fibre Channel (FC) switch, for example.

Firstly, the composition of the host computer 12 will be described. The host computer 12 is a computer which uses data stored in a storage device 13. The host computer 12 comprises a CPU (central processing unit) 121, a memory 122, a LAN interface (LAN I/F) 151, and a SAN interface (SAN I/F) 171.

The memory 122 stores an application program (hereinafter, called "AP") 124, a controlling program 125, a path management program 126, an operating system (hereinafter, called "OS") 127, and a path management table 128. These programs (the AP 124, the controlling program 125 and the OS 127) and the path management table 128 are described in more detail hereinafter.

The CPU 121 executes various programs (the AP 12A, the controlling program 125 and the OS 127) stored in the memory 122, and carries out various types of processing, such as path management processing, or data input and output processing, to and from the storage device 13. The LAN I/F 151 is an adapter whereby the internal device is able to communicate with other devices connected to the LAN 15.

The SAN I/F 171 is an adapter for inputting and outputting data between the host computer 12 and the storage device 13, via the SAN link 17. In the present embodiment, an example is described wherein a HBA (Host Bus Adapter) of the Fibre Channel (FC) is used in the SAN I/F 171, but the invention is not limited to this. It is also possible to use another protocol, such as SCSI, ISCSI, InfiniBand, or the like, for connecting the host computer 12 and the storage device 13. The SAN I/F 171 should be an adapter that is compatible with these respective protocols.

Next, the composition of the storage device 13 is described. The storage device 13 is a storage system which comprise a controller 132 and a disk device 133, such as a hard disk drive, or the like.

The storage device 13 comprises at least one logical volume 131. The logical volume 131 is a logical storage region constituted by a physical storage region of the disk device 133 of the storage device 13, and it has a unique identifier (path identifier) within the computer system. The logical volume 131 is recognized by the devices connected to the storage device 13, such as the host computer 12, and the like, to be a single storage device that is independent in logical terms. The host computer 12 issues a data access request relating to the logical volume 131 identified by the path identifier.

In the present embodiment, a combination of the "WWN (World Wide Name)" or "Port ID" according to FC specifications, and the "logical unit number (LUN)" is used as a path identifier for identifying the logical volume 131. However, the specific composition of the path identifier is not limited to this. As described hereinafter, in the present embodiment, a plurality of path identifiers may be assigned to a single logical volume. The plurality of path identifiers assigned to one logical volume may be constituted in such a manner that they have a common "WWN" or "Port ID", and different "LUN" values. Moreover, it is also possible to adopt a composition for the path identifiers wherein the "LUN" is common, and the "WWN" or "Port ID" are different.

The controller 132 controls the data access processing performed with the host computer 12, via the SAN link 17. Furthermore, the controller 132 transmits and receives data, to and from devices connected to the storage device 13, such as a management server, or the like, via the LAN 15. The controller 132 comprises a CPU (central processing unit) 134, a memory 135, a LAN I/F 151, and a SAN I/F 172. The LAN I/F 151 belonging to the controller 132 is the same as that belonging to the host computer 12 described above.

An I/O processing program 136, a configuration management program 137, a path identifier management table 138, and a logical volume management table 139 are stored in the memory 135. The respective programs (I/O processing program 136 and configuration management program 137) and the respective tables (path identifier management table 138 and logical volume management table 139) are described in detail hereinafter.

The CPU 134 executes the respective programs (the I/O processing program 136 and the configuration management program 137) stored in the memory 135, and carries out various processes, such as data input and output processing, with respect to the host computer 12.

The SAN I/F 172 is an adapter for inputting and outputting data from and to the host computer 12, via the SAN link 17. The SAN I/F 172 receives access requests relating to at least one path identifier. Furthermore, if a plurality of path identifiers are associated with a single logical volume, by means of a single SAN I/F 172, then a minimum of one SAN I/F 172 is required. However, if only one path identifier is associated with one logical volume having one SAN I/F 172, then a plurality of SAN I/Fs 172 are required.

Next, the composition of the management server 16 will be described. The management server 16 is a computer for managing the storage device 13, for instance, changing the settings in same, and the like. The management server 16 comprises a CPU (central processing unit) 161, a memory 162, and a LAN I/F 151. The LAN I/F 151 of the management server 16 is the same as that belonging to the host computer 12 described above.

A management program 163 is stored in the memory 162. Setting processes of various types are executed in the storage device 13, by means of the CPU 161 executing the management program 163. These setting processes of various types include, for example, processing for creating or deleting a logical volume 131, processing for associating a logical volume 131 with a path identifier, processing for defining or terminating logical volume pairs for creating a snapshot, processing for re-synchronizing pairs of logical volumes 131 that have been split, and the like. In the present embodiment, the processing for splitting a pair of logical volumes 131 which have been defined as a pair is not carried out by means of an instruction from the management server 16 (the pair splitting process is described in more detail hereinafter). The function of the management server 16 may be realized by means of a host computer 12.

Next, the function of the management console 14 will be described. The management console 14 is a computer device whereby a system administrator is able to control the management server 16 and the host computer 12. The management console 14 is able to communicate mutually with the management server 16, by means of the LAN 15. Further, the management console 14 is able to communicate with the host computer 12, by means of the LAN 15. Furthermore, the management console 14 is able to communicate mutually with the storage device 13, by means of the LAN 15. The functions of the management console 14 may be realized by means of the management server 16 and the host computer 12.

Next, the operating principles of the respective programs according to the present embodiment will be described.

Figure 2:
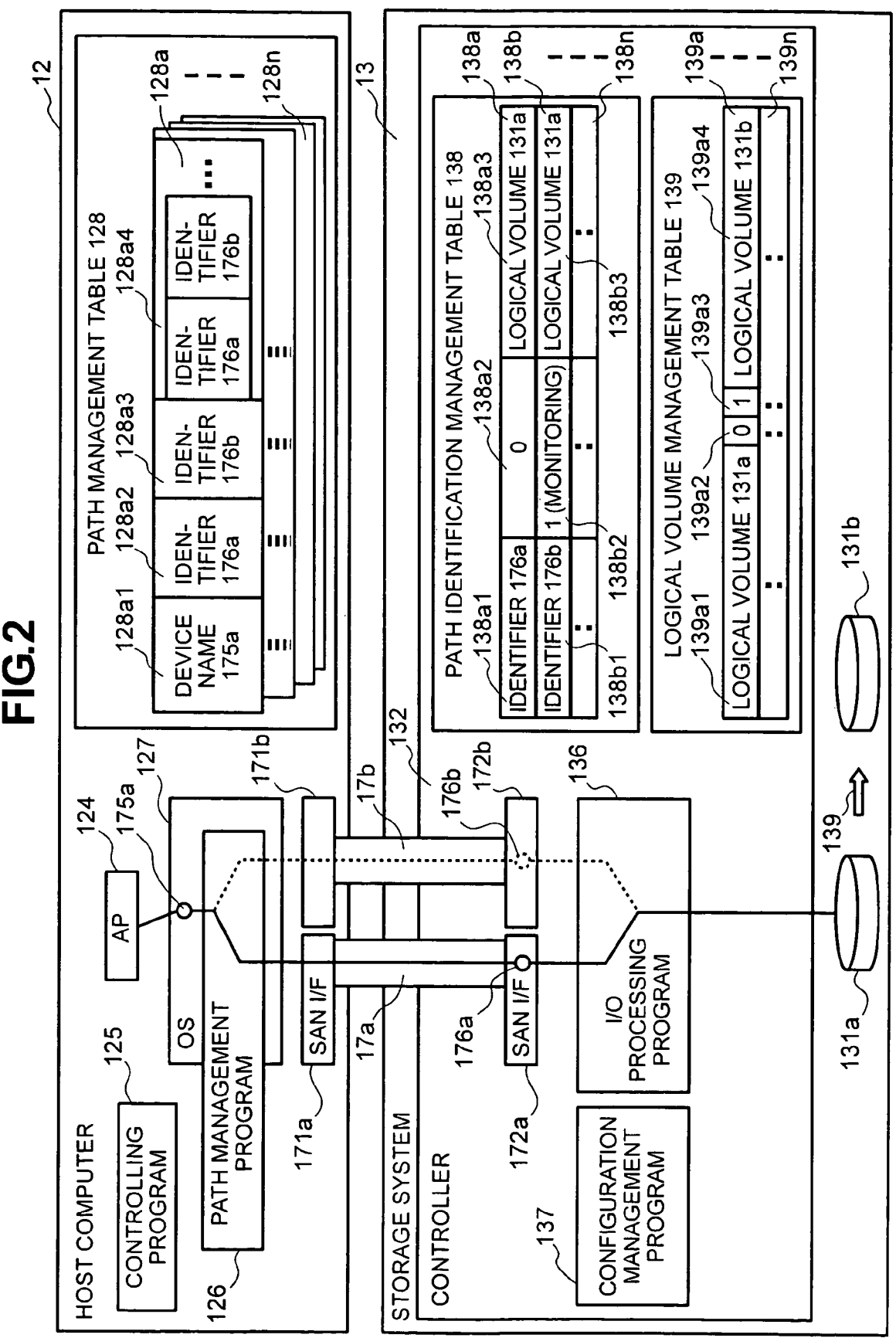
FIG. 2 is a conceptual diagram showing the operating principles of respective programs according to an embodiment of the present invention.

FIG. 2 is a conceptual diagram illustrating the operating principles of the respective programs according to the present embodiment. FIG. 2 shows a state of synchronism between a data access process from the host computer 12 to the storage device 13, and pair split processing, in other words, a state where preparations for accepting pair split processing have been completed.

Moreover, it is assumed that in the storage device 13, upon receiving an instruction from the management server 16, the logical volume 131a and the logical volume 131b have been defined as a snapshot pair, respectively forming a primary volume and a secondary volume. Furthermore, it is supposed that two path identifiers 176a and 176b have been assigned to the logical volume 131a which is to be the primary volume. The data structures of the respective tables illustrated serve merely as examples.

Firstly, the respective programs of the host computer 12, and the path management table 128 will be described.

The AP 124 is a program for providing the basic functions of the host computer 12, by using the logical volume 131. For the AP 124, it is possible to use a DBMS (DataBase Management System), or a file server program.

The OS 127 is a program for supplying the environment required in order for the CPU 121 to execute the AP 124. For example, the OS 127 provides a device name 175a corresponding to the logical volume 131 required in order for the CPU 121 to execute the AP 124. The CPU 121 executes the AP 124, and designates the device name 175a provided by the OS which is associated with the logical volume 131. The CPU executes the path management program described hereinafter, and converts the device name 175a to a path identifier 176. Thereupon, the CPU 121 executes the OS 127, controls the SAN I/F 171, and accesses the logical volume 131 of the storage device 13 identified by the converted identifier 176, in order to carry out data input and output processing.

The controlling program 125 is a program for controlling the execution of the AP 124, the OS 127, and the path management program 126.

The path management program 126 is incorporated partially into the OS 127, and serves to convert the device name 175a provided by the OS 127 into a path identifier 176, in accordance with the data stored in the path management table 128.

The path management table 128 has one or more entries 128(a–n), and each one of these entries 128(a–n) comprises four data storage sections. For example, the entry 128a comprises four data storage sections 128a1–a4. Each entry 128(a–n) has a similar data structure. In the following description, the description refers to entry 128a, as an example.

One "device name 175a" is stored in the first data storing section 128a1 of the entry 128a. One "path identifier 176" associated with the device name stored in data storage section 128a1 is stored in the second data storage section 128a2 of the entry 128a. The "path identifier 176" for currently associating with the device name 175a stored in the data storage section 128a1, is stored in this second data storage section 128a2.

One "path identifier 176" related to the data storage section 128a1, or a "NULL value" indicating empty content, is stored in the third data storage section 128a3 of the entry 128a. This data storage section 128a3 stores the path identifier 176 for causing pair split processing to be executed in the storage device 13 prior to data access processing. Furthermore, if no path identifier for causing pair split processing to be executed in the storage device 13 prior to data access processing is established, then a "NULL value" is stored in the data storage section 128a3.

A path identifier list including the aforementioned one or more path identifiers 176 related to the data storage section 128a1 are stored in the fourth data storage section 128a4.

A plurality of path identifiers 176a, 176b can be associated with any one device name 175a. If a plurality of path identifiers 176a, 176b are associated with one device name 175a, then the host computer 12 is able to switch the path identifier 176 used, in accordance with the load status of the SAN link 17, and the like, and the results of executing other programs, and so on. Here, the processes of setting and changing the path management table 128 as performed by the host computer 12 according to the present embodiment will be described.

The host computer 12 receives an instruction from the administrator, and stores the path identifiers (in the example illustrated, 176a and 176b) which can be associated with the device name 175a stored in the data storage section a1, in the fourth data storage section 128a4 of the entry 128a. Thereupon, the host computer 12 receives an instruction from the administrator and stores a path identifier 176 to be associated with that device name 175a, in the data storage section 128a2 of the entry 128a. In the example illustrated, "the path identifier 176a" is stored in the data storage section 128a2. In this case, when the host computer 12 accesses the logical volume 131 of the storage device 13, the device name 175a provided by the OS is converted into a path identifier 176a, and a data access request addressed to that path identifier 176a is carried out.

Next, the processing for changing the "path identifier 176" to which the "device name 175a" is converted, as carried out by the host computer 12, is described. The host computer 12 receives an instruction from the administrator and selects the other path identifier 176 to the path identifier 176a stored in the data storage section 128a2 (in the example shown, the "path identifier 176b"), from the path identifiers 176 stored in the data storage section 128a4. The host computer 12 changes the data stored in the data storage section 128a2 to the path identifier thus selected. For example, it is supposed that the host computer 12 has changed the data in the data storage section 128a2 of the entry 128a, from "path identifier 176a" to "path identifier 176b". In this case, the host computer 12 identifies the path identifier 176b, from the device name 175a.

The processing for changing the "path identifier 176" that is converted to from the "device name 175a", as carried out by the host computer 12, is performed by means of the CPU 121 executing a controlling program 125 (the processing for changing the path identifier as carried out by the controlling program 125 is described hereinafter).

Furthermore, it is supposed that the same path identifier as the path identifier stored in the data storage section 128a3 is stored in the data storage section 128a2 of the path management table 128. In this case, the host computer 12 identifies the path identifier for executing pair split processing in the storage device 13 prior to access processing, from the device name 175a.

In this way, in the present embodiment, the host computer 12 is able to request data access processing and pair split processing at the same timing, from the storage device 13, by issuing an access request to the path identifier 176b.

Next, the respective programs and the respective tables belonging to the storage device 13 will be described.

Initially, the data structure of the path identifier management table 138 and the logical volume management table 139 will be described. The initial data settings in the path identifier management table 138 and the logical volume management table 139 are made by means of the CPU 134 executing the configuration management program 137, upon receiving an instruction from the management server 16.

The path identifier management table 138 has one or more entries 138(a–n) and furthermore, each entry 138(a–n) comprises three data storage sections. In the example illustrated, the entry 138a comprises three data storage sections 138a1–a3. Similarly, the entry 138b comprises three data storage sections 138b1–b3.

One path identifier 176 is stored in the first data storage section of the entry 138(a–n). A monitoring flag (a flag indicating "0" or "1") for judging whether or not it is necessary to monitor data access requests to the path identifier stored in the first data storage section, is stored in a second data storage section of the entry 138(a–n). In the present embodiment, if the value "0" is stored as a monitoring flag in the second data storage section, then this indicates that monitoring is not required, and if the value "1" is stored, then this indicates that monitoring is required. The logical volume 131 identified by the path identifier stored in the first data storage section is stored in the third data storage section of the entry 138(a–n).

In the example illustrated, the "path identifier 176a" is stored in the first data storage section 138a1 of the entry 138a. The monitoring flag "0" is stored in the second data storage section 138a2 of the entry 138a. Furthermore, a "logical volume 131a" is stored in the third data storage section 138a3 of the entry 138a. This indicates that the logical volume identified by the "path identifier 176a" is the "logical volume 131a". Furthermore, it also indicates that monitoring of data access processing to the "path identifier 176a" is not required.

Moreover, the data storage sections 138b1–138b3 of the entry 138b illustrated in the diagram respectively contain: "path identifier 176b", "1" and "logical volume 131a". This indicates that the logical volume identified by "path identifier 176b" is the "logical volume 131a". Furthermore, it also indicates that monitoring of data access processing to the "path identifier 176b" is required.

In this way, by composing a path identifier management table 138, the CPU 134 is able to identify which logical volume 131 the data access request addressed to a particular path identifier 176 relates to, by referring to the first data storage section 138n1 and the third data storage section 138n3, whilst executing an I/O processing program 136. Furthermore, the CPU 134 is able to identify whether or not it is necessary to monitor data access requests addressed to a path identifier 176, by referring to the first data storage section 138n1 and the second data storage section 138n2 of the entry 138n.

Next, the data structure of the logical volume management table 139 will be described. As shown in the drawings, the logical volume management table 139 comprises one or more entries 139a, and furthermore, one entry 139a comprises four data storage sections.

Data indicating one logical volume 131 is stored in the first data storage section 139n1 of the entry 139n. The second data storage section 139n2 of the entry 139n stores a flag (having a value of "0" or "1") indicating whether or not data access processing to the logical volume stored in the data storage section 139n1 is to be deferred. In the description of the present embodiment, if "0" is stored in the data storage section 139n2, then this indicates that deferral of data access processing is not required, and if "1" is stored therein, then this indicates that it is necessary to defer data access processing. A flag indicating the paired status of the logical volume stored in the data storage section 139n1 is stored in the third data storage section 139n3 of the entry 139n. One of three types of flags, "0", "1", "2", is stored in the third data storage section 139n3. The "0", "1", "2" values described above respectively indicate "a state where the pair of the logical volume 131 is not defined", "a state where the pair of the logical volume 131 is defined and is not split", and "a state where the pair is defined and has been split". Data indicating a secondary volume is stored in the fourth data storage section 139n4 of the entry 139n (if the pair is not defined, then "NULL value" is stored).

In the example illustrated, the values "logical volume 131a", "0", "1" and "logical volume 131b" are stored respectively in the data storage sections 139a1–a4 of the entry 139a. This indicates that there is no need to defer data access processing relating to the logical volume 131a. Furthermore, it also indicates that the logical volume 131b has been defined as a pair for the logical volume 131a, and that the pair has not been split.

The CPU 134 identifies whether or not it is necessary to defer data access processing to the logical volume 131, by referring to the second data storage section 139n2 of the corresponding entry 139n in the path identifier management table 139. Furthermore, the CPU 134 identifies the paired state of the logical volume, by referring to the third data storage section 139n3 of the corresponding entry 139n of the path identifier management table 139.

Next, the respective programs of the storage device 13 will be described.

The I/O processing program 136 is a program for reading and writing data to and from the logical volume 131, in accordance with data input and output requests from a host computer 12. The CPU 134 carries out data access processing to the logical volume 131, in accordance with the input/output request from the host computer 12, by executing the I/O processing program.

Furthermore, the I/O processing program 136 also causes the CPU 134 to execute processing for copying data to a secondary volume, in the case that a pair has been defined for the logical volume 131. More specifically, if the region to be accessed for writing by the host computer 12 is the primary volume 131a (if the secondary volume 131b has been defined in the fourth data storage section 139n4, in the corresponding entry 139n of the logical volume management table 139), then processing for copying to the secondary volume 131b is also carried out by the CPU 134, by executing the I/O processing program 136.

The configuration management program 137 is a program for controlling the operation of the I/O processing program 136. By executing the configuration management program 137, the CPU 134 makes settings relating to the storage device 13, upon receiving instructions from the management server 16.

For example, it is supposed that the CPU 134 receives respective instructions from the management server 16 indicating "create logical volume 131a and logical volume 131b", "allocate path identifier 176a to logical volume 131a", and "define logical volume 131a and logical volume 131b respectively as a primary volume and a secondary volume in a snapshot pair". In this case, the CPU 134 carries out pair definition processing in accordance with received instructions, by executing the configuration management program 137.

Thereupon, after defining the pair, the CPU 134 allocates a separate path identifier 176b as an alternative path for the primary volume 131a, and returns this information to the management server 16. In other words, the CPU 134 creates a new entry (for example, entry 138b) in the path identifier management table 138, and it respectively stores "path identifier 176b", "1" and "logical volume 131a" in the three data storage sections (for example, data storage sections 138b1–138b3) in the corresponding entry (for example, the entry 138b). The CPU 134 transmits the path identifier 176b allocated as an alternative path for the primary volume 131a, to the management server 16, via the LAN 15.

The management server 16 transmits the path identifier 176b transmitted by the storage device 13, together with the path identifier 176a, in the host computer 12. The host computer 12 receives the path identifier 176b and the path identifier 176a thus transmitted, and updates the data in the path management table 128. More specifically, the host computer 12 appends a "path identifier 176b" to the fourth data storage section 128a4 of the entry 128a of the path management table 128, and it stores the "path identifier 176b" in the third data storage section 128a3 thereof.

Next, data access processing and snapshot pair splitting request processing implemented by the host computer 12 with respect to the storage device 13, is described with reference to FIG. 2 and FIG. 3.

Figure 3:
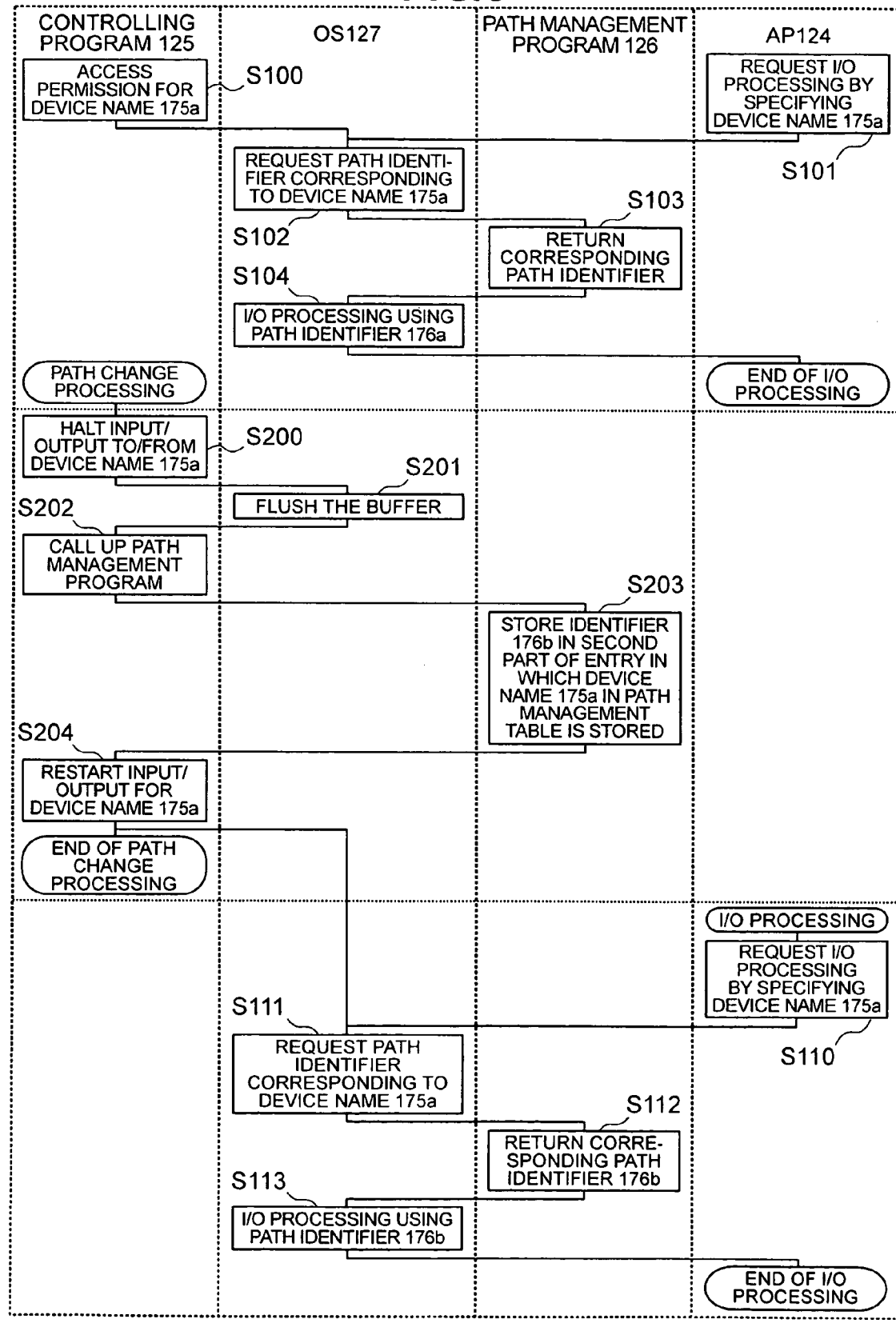
FIG. 3 is a flowchart of data access request processing and processing for carrying out a snapshot pair split request, performed by a host computer according to the present embodiment.

FIG. 3 is a flowchart of data access processing and snapshot pair splitting request processing implemented by the host computer 12.

Here, it is supposed that the device name 175a provided by the OS 127 corresponds to the logical volume 131a of the storage device 13. Furthermore, it is supposed that, in the storage device 13, the logical volume 131b has been defined as a secondary volume for the logical volume 131a (primary volume).

Moreover, it is supposed that the path management table 128 of the host computer 12 is set to the contents illustrated in FIG. 2. In other words, the "path identifier 176a" is associated with the "device name 175a". Furthermore, "path identifier 176b" is set as the path identifier 176 for causing pair split processing to be executed in the storage device 13, before data access processing.

Firstly, the data access processing carried out by the host computer 12 with respect to the storage device 13 will be described.

After starting up the host computer 12, in accordance with the controlling program 125, the CPU 121 sets up the OS 127 in such a manner that it can receive an access request addressed to the device name 175a (S100).

Thereupon, in accordance with the AP 124, the CPU 121 receives a request for data access to the storage device 13, from the user. In accordance with the AP 124, the CPU 121 issues a data access request specifying the device name 175a provided by the OS 127, to the OS 127 that is operating (S101).

Subsequently, in accordance with the OS 127, the CPU 121 calls up the path management program 126 in order to obtain the path identifier 176 corresponding to the device name 175a (S102).

The CPU 121 converts the device name 175a to the corresponding path identifier 176, by means of the path management program 126. More specifically, in accordance with the path management program, the CPU 121 searches the path management table 128 and selects the entry 128a in which the device name 175a is stored. In accordance with the path management program 126, the CPU 121 identifies the path identifier 176a from the second data storage section 128a2 of the selected entry 128a, and writes this to a prescribed region of the memory 122, whereupon it transfers to processing the OS 127 (S103).

In accordance with the OS 127, the CPU 121 reads out the path identifier 176a written to the prescribed region of the memory 122, and it outputs a data access request addressed to the path identifier 176a, to the storage device 13, via the SAN I/F 171 (S104). The path identifier 176a is a path identifier used when requesting data access processing to the storage device 13. The storage device 13 having received the data access request addressed to the path identifier 176a accesses the data in the logical volume 131a identified by the path identifier 176a.

For example, if the data access request thus received is for data read processing, then the storage device 13 reads out data from the logical volume 131a and transmits the read data to the host computer 12. Furthermore, for example, if the I/O processing request thus received is for data write processing, then the storage device 13 stores the write data in a prescribed region of the logical volume 131a. Moreover, if the storage device 13 has received write data (if write data is stored in the cache (not illustrated)), then the completion of write processing is transmitted to the host computer 12.

In accordance with the OS 127, the CPU 121 of the host computer 12 receives the data for data access processing transmitted by the storage device 13, and transfers the data thus received to the AP 124, whereupon it terminates processing.

Next, the processing for changing the path identifier 176 will be described.

The host computer 12 according to the present embodiment starts processing for changing the path identifier 176, at a prescribed timing. With regard to the prescribed timing at which processing for changing the path identifier 176 is started, in the following description, it is supposed that the process of changing the path identifier 176, instead of the process of pair splitting, at the timing at which it is sought to use the data in the secondary volume defined to correspond to the primary volume 131a, as back-up data, in other words, at the timing at which it is sought to carry out pair splitting. The timing is not particularly limited to being the time at which it is sought to split the pair, and, for example, it may also be the time at which the host computer 12 receives a pair splitting instruction from the administrator. Furthermore, for example, the timing at which it is desired to carry out a pair splitting process may be determined previously in the host computer 12 (for example, it is set that the data in the secondary volume at a prescribed point in time is to be used as back-up data).

Firstly, the CPU 121 executes the controlling program 125 at the timing at which pair splitting is carried out, and it changes the settings in the OS 127 in such a manner that a data access request specifying the device name 175a is not carried out (step 200).

Thereupon, by means of the OS 127, the CPU 121 identifies whether or not the data for access processing to the logical volume 131a is stored in the buffer managed by the OS (not illustrated). If the data for access processing to the logical volume 131a has been stored in the buffer, then in accordance with the OS 127, the CPU 121 flushes the data from the buffer and writes it to the logical volume 131a (step 201).

Thereupon, the CPU 121 returns to processing the controlling program 125, and calls the path management program 126 (step 202). The CPU 121 executes the path management program and changes the path identifier 176 of the second data storage section 128a2 of the entry 128a in the path management table 128 in which the device name 175a is stored. More specifically, the CPU 121 selects the same path identifier 176 as the path identifier 176b stored in the third data storage section 128a3 of the entry 128a, from the path identifiers 176 in the fourth data storage section 128a4 of the entry 128a. The CPU 121 stores the selected path identifier 176b in the second data storage section 128a2 of the entry 128a (step 203).

Thereupon, the CPU 121 returns to the processing of the controlling program 125, and changes the settings in the OS 127, in such a manner that the AP 124 restarts the data access to the logical volume 131a (S204). Thereafter, the data access processing to the device name 175a which accompanies the processing of the AP 124 is addressed to the path identifier 176b.

Next, the processing executed by the host computer 12 after the path identifier 176 has been changed will be described.

The CPU 121 carries out processing similar to that in steps S101 to 102 above (S110–111), and then proceeds to the processing in S112.

At S112, the CPU 121 carries out similar processing to that in S103. However, in step S203 described above, the CPU 121 changed the data in the entry 128a of the path management table 128 in which "device name 175a" is stored. In other words, the data stored in the second data storage section 128a2 of the path management table 128 is changed from "path identifier 176a" to "path identifier 176b". Therefore, at S112, the CPU 121 converts device name 175a into "path identifier 176b", and then transfers to the processing of the OS 127.

At S113, in accordance with the OS 127 being executed, the CPU 121 outputs an I/O processing request addressed to the "path identifier 176b", to the storage device 13, via the SAN I/F 171 (S113). The "path identifier 176b" is the path identifier for use when requesting that the pair splitting process for the logical volume 136 is carried out before the I/O processing.

Therefore, the storage device 13 having received an I/O request addressed to "path identifier 176b" carries out a pair splitting process, before the input/output processing, and then carries out I/O processing with respect to the logical volume 134a.

In this way, according to the present embodiment, a plurality of path identifiers for identifying a logical volume 131 are established, for a single logical volume 131 of the storage device 13. Moreover, it is determined that if a data access request is made using a prescribed path identifier 176 of the plurality of path identifiers 176, then pair split processing is carried out before data access processing. In the present embodiment, a path identifier is established for use when issuing a request to "carry out pair splitting process before data access processing", if it is desired to split the pair of the logical volume 131.

Therefore, in the present embodiment, it is possible to eliminate the trouble of adjusting the timing at which data access processing and pair split processing are carried out.

Next, the data access processing and the pair split processing carried out by the storage device 13 is described with reference to FIG. 2 and FIG. 4.

Figure 4:
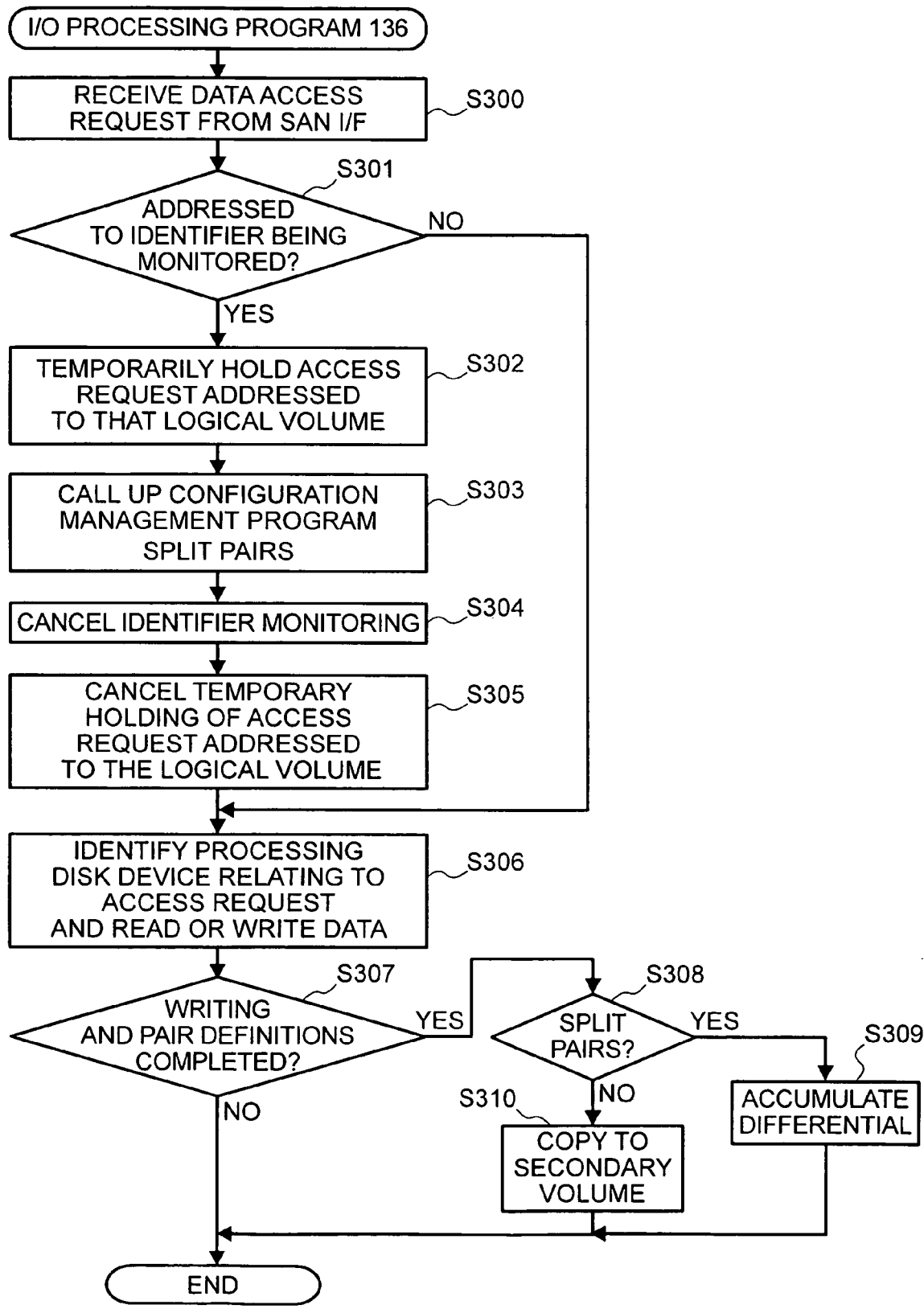
FIG. 4 is a flowchart of data access processing and pair split processing carried out by a storage device according to the present embodiment.

FIG. 4 is a flowchart of the data access processing and pair split processing carried out by the storage device 13. In the description of this flowchart, it is supposed that the data illustrated in the example in FIG. 2 has been set in the path identifier management table 138 and the logical volume management table 139 of the storage device 13.

The CPU 134 executes the I/O processing program 136 and firstly, it receives a request for data access processing, from the host computer 12 via the SANI/F 172 (S300).

Thereupon, in accordance with the I/O processing program 136, the CPU 134 determines whether or not the data access request thus received is addressed to a path identifier 176 that is being monitored (S301).

More specifically at S301, in accordance with the I/O processing program 136, the CPU 134 reads out the path management table 138, and identifies the entry 138(a–n) in which the path identifier 176 forming the destination of the received data access request is stored. In accordance with the I/O processing program 136, the CPU 134 refers to the data in the second data storage section of the identified entry 138(a–n). If the value "1" is stored in the second data storage-section of the identified entry 138(a–n), then the CPU 134 judges that the path identifier 176 forming the destination of the received data access request is a path identifier that is being monitored, and hence it advances to the processing in S302. If, on the other hand, the value "0" is stored in the second data storage section of the identified entry 138(a–n), then the CPU 134 judges that monitoring of the path identifier 176 forming the destination of the received data access request is not required, and hence it advances to the processing in S306. In the present example, the CPU 134 advances to the processing in S302 if it receives a data access request directed to "path identifier 176b". Furthermore, the CPU 134 advances to the processing in S306, if it receives a data access request directed to "path identifier 176a".

In S302, the CPU 134 carries out processing for temporarily deferring the data access request to the logical volume 131a corresponding to the path identifier 176b, in accordance with the I/O processing program 136. More specifically, in accordance with the I/O processing program 136, the CPU 134 stores the value "1" in the second data storage section 139a2 of the corresponding entry 139a in the logical volume management table 139.

Thereupon, the CPU 134 transfers processing to the composition management program 125, carries out pair split processing, and stores the value "2" in the third data storage section 139a3 of the corresponding entry 139a of the logical volume management table 139 (S303).

Upon completing the pair splitting process, the CPU 134 transfers processing to the I/O processing program 136, and the monitoring of the path identifier 176b is terminated (S304). In other words, in accordance with the I/O processing program, the CPU 134 stores the value "0" in the data storage section 138b2 of the entry 138b of the path identifier management table 138 which stores the path identifier 176b.

Thereupon, the CPU 134 releases the temporary deferral of the data access request to the logical volume 131a, in accordance with the I/O processing program 136 (S305). More specifically, the CPU 134 stores "0" in the second data storage section 139a2 of the corresponding entry 139a in the logical volume management table 139.

Thereafter, in accordance with the I/O processing program 136 which is operating, the CPU 134 implements the received data access processing (S306). More specifically, in accordance with the I/O processing program 136, the CPU 134 reads or writes data to a particular disk device 133 forming an input/output destination.

Thereupon, in accordance with the I/O processing program 136 which is operating, the CPU 134 judges whether or not the received data access request is a data write request, and whether or not the secondary volume 131b has been defined as a snapshot pair for the logical volume 131a. If the data access request is a data write request, and if the secondary volume 131b has been defined as a snapshot pair for the logical volume 131a, then the CPU 134 advances to S308, and if this is not the case, then it terminates processing.

At S308, in accordance with the I/O processing program 136 which is operating, the CPU 134 determines whether or not the defined pair has been split. The CPU 134 advances to S309 if it judges that the pair has been split, and it advances to S310 if it judges that the pair has not been split. More specifically, the CPU 134 judges that the defined pair has been split, if the value "2" is stored in the third data storage section 139a3 of the corresponding entry 139a in the logical volume management table 139. On the other hand, the CPU 134 judges that the defined pair has not been split, if the value "1" is stored in the third data storage section 139a3 of the corresponding entry 139a.

At S309, the CPU 134 accumulates differential data on the basis of the I/O processing program 136 being operated, and it then terminates processing. At S310, on the other hand, the CPU 134 copies data to the secondary volume 131b, in accordance with the I/O processing program 136, and it then terminates processing.

At step 301, if the request is not addressed to the path identifier 176b being monitored, then the processing from step 306 onwards is executed, whereupon processing is terminated.

As described previously, in the present embodiment, the host computer 12 issues a pair split instruction to the storage device 13, by changing the path to the logical volume 131a, in other words, by changing the destination of the data access request from the path identifier 176a to the path identifier 176b. In the storage device 13, if a data access request addressed to the path identifier 176b is received, then pair split processing is carried out before data access processing, whereupon the data access processing is carried out when the pair split processing has completed. Therefore, a request for data access processing after a pair split instruction will never be processed by the primary volume 131a, before the pair splitting process has been carried out. In other words, in the present embodiment, it is possible to acquire the data of the secondary volume, as back-up data, when it is wished to carry out pair splitting. Consequently, in the present embodiment, it is possible to eliminate the need for the host computer 12 to wait until the actual pair splitting process has been completed.

Furthermore, since it is not necessary to wait before carrying out an operation of reversing the pair split, and reflecting the difference accumulated in the primary volume, in the secondary volume (this process being called "pair re-synchronization"), then a conventional method can be used, and hence the details of this processing are not described in particular here.

Furthermore, pair split processing after re-synchronization can be achieved by means of the processing steps described below. The pair split processing after re-synchronization is described with reference to FIG. 2.

Specifically, the CPU 121 executes the path management program 126 (the CPU 121 calls up the program by executing the controlling program 125), and updates the data in the path management table 128. In other words, the CPU 121 selects a path identifier 176 other than the path identifier 176b stored in the data storage section 128a3 of the entry 128a, from the group of path identifiers 176 stored in the data storage section 128a4 of the entry 128a in which the device name 175a is stored (in the example in FIG. 2, the path identifier 176a is selected). The CPU 121 then stores the selected path identifier 176 in the second data storage section 128a2 of the entry 128a.

Thereupon, the CPU 121 waits for completion of the data access processing to the path identifier 176b (for example, it waits for a sufficiently long period of time), and then requests the controller 132 of the storage device 13 to monitor the path identifier 176b. In the controller 132 having received this request, the CPU 134 calls up the configuration management program 137, and stores the value "1" in the second data storage section 138b2 of the entry 138b of the path identifier management table 138 which corresponds to the path identifier 176b.

SECOND EMBODIMENT

Next, a second embodiment of the present invention will be described.

The second embodiment is the same as the first embodiment, with the exception of the fact that the following processing is different. More specifically, in the second embodiment, the path identifier 172b is specified by the system administrator, and it is indicated to the storage device 13 when the CPU 161 of the management server 16 executes the management program 163.

The CPU 134 executes the configuration management program 137 and receives the path identifier 172b from the management server 16, and when a pair of storage volumes has been defined, it assigns this path identifier 172b to the logical volume 131a.

In this way, by means of the system administrator specifying the path identifier 172b, it is possible to adapt to cases where the path identifier 172b cannot be handled due to the type of OS 127 used, for example, a case where the maximum limit for the LUN has been exceeded, or the like.

The present invention is not limited to the embodiments described above, and various modifications are possible without deviating from the essence of the present invention. For example, in the description of the present embodiments, it is supposed that if the host computer 12 has issued a data access request addressed to the path identifier 176*b*, to the storage device 13, then the storage device 13 will carry out a pair splitting process before data access processing, but the invention is not limited to this in particular. The processing carried out prior to data access processing may be other processing carried out inside the storage device 13.

Furthermore, in the description of the present embodiment, a case was described wherein one type of "path identifier 176*b*" is established as a path identifier for causing the pair splitting process to be carried out before the data accessing process, but the invention is not limited to this. For example, if there are a plurality of internal processes of the storage device which require synchronization with data access processing, then it is possible to allocate a path identifier 176 to the logical volume 131, for each process requiring synchronization with the data access processing.

Furthermore, in the description of the present embodiment, the timing at which it is wished to carry out split processing is taken as an example of the timing at which the path identifier 176 is changed, but the invention is not limited to this in particular. For example, it is also possible to change the path identifier 176 of the host computer 12 by means of an instruction from the administrator, for example.

What is claimed is:

1. A method for data accessing in a computer system comprising a host computer and a storage system coupled to said host computer, said storage system comprises a controller and a logical volume said storage system being coupled to said computer, said method comprising the steps of:
    issuing an access request from said computer to said storage system by using one of a first path and a second path, both of said first path and said second path corresponds to said logical volume;
    in said storage system, accessing said logical volume, if said storage system receives an access request via said first path, and
    in said storage system, executing a predetermined process and accessing said logical volume after the finish of said predetermined process, if said storage system receives an access request via said second path;
    wherein said storage system comprising a primary volume and a secondary volume, said primary volume and said secondary volume are paired and copy data of said primary volume is stored in said secondary volume, wherein said first path and said second path corresponds to said primary volume, and wherein said predetermined process is splitting the pair between said primary volume and said secondary volume.

2. A method for data accessing according to claim 1, further comprising a step of: selecting said second path for issuing an access request to said primary volume by said host computer, when said host computer instructs said storage system to split the pair.

3. A method for data accessing according to claim 1, wherein said host computer designates a path by using a path ID including at least logical unit number according to SCSI, and the logical unit number of said first path and the logical unit number of said second path have a same value.

4. A method for data accessing according to claim 1, wherein said host computer comprises an interface coupled to said storage system, and said host computer designates a path by using a path ID including at least port ID assigned to an interface, and the port ID of said first path and the port ID of said second path have a same value.

5. A method for data accessing according to claim 1, wherein said storage system comprises an interface coupled to said host computer, and said host computer designates a path by using a path ID including at least port ID assigned to the interface, and the port ID of said first path and the port ID of said second path have a same value.

6. A storage system coupled to a host computer, comprising: a logical volume accessed via one of a first path and a second path from said host computer; a controller receiving an access request from said host computer via one of said first path and said second path, and accessing said logical volume according to the received access request; wherein if said controller receives an access request via said first path, said controller accesses said logical volume according to the received access request, and if said controller receives an access request via said second path, said controller executes a predetermined process, and after the finish of said predetermined process, said controller accesses said logical volume according to the received access request;
    a primary volume accessed via one of said first path and said second path; and a secondary volume storing copy data of said primary volume; wherein said primary volume and said secondary volume are paired, and said predetermined process is splitting the pair between said primary volume and said secondary volume.

7. A computer coupled to a storage system, said storage system comprises a logical volume corresponding to both of a first path and a second path, comprising: means for selecting a path used for accessing said logical volume from said first path and said second path, and means for issuing an access request to said storage system via the selected path, wherein if said computer instruct said storage system to executes a predetermined process before accessing said logical volume, said means for selecting a path selects said second path and said means for issuing an access request issues an access request for said logical volume via said second path, and otherwise, said means for selecting a path selects said first path and said means for issuing an access request issues an access request for said logical volume via said first path;
    wherein said storage system further comprises another logical volume which is paired with said logical volume and stores copy data of said logical volume, and wherein said predetermined process is splitting the pair between said logical volume and said another logical volume.

8. A computer system comprising: a host computer; and a storage system coupled to said host computer; wherein said storage system comprises a logical volume corresponding to both of a first path and a second path used for accessing said logical volume from said host computer, and a controller accessing said logical volume according to an access request received from said host computer, wherein said host computer selects one of said first path and said second path, and issues an access request for said logical volume to said storage system via the selected path, and if said storage system receives an access request via said first path, said controller accesses said logical volume, and if said storage system receives an access request via said second path, said controller executes a predetermined process, and after the finish of the predetermined process, said controller accesses said logical volume;

wherein said storage system further comprises another logical volume which is pared with said logical volume and stores copy data of said logical volume, and wherein said predetermined process is splitting the pair between said logical volume and said another logical volume.

* * * * *